United States Patent
Iwasaki et al.

(10) Patent No.: US 12,404,201 B2
(45) Date of Patent: Sep. 2, 2025

(54) PREFORM FOR OPTICAL FIBER AND MANUFACTURING METHOD OF OPTICAL FIBER

(71) Applicant: KOHOKU KOGYO Co., Ltd., Nagahama (JP)

(72) Inventors: Katsuhiro Iwasaki, Nagahama (JP); Qiuyue Piao, Nagahama (JP); Yusuke Kinoshita, Nagahama (JP)

(73) Assignee: KOHOKU KOGYO CO., LTD., Nagahama (JP)

( * ) Notice: Subject to any disclaimer, the term of this patent is extended or adjusted under 35 U.S.C. 154(b) by 304 days.

(21) Appl. No.: 18/040,880

(22) PCT Filed: Aug. 5, 2021

(86) PCT No.: PCT/JP2021/029123
§ 371 (c)(1),
(2) Date: Feb. 7, 2023

(87) PCT Pub. No.: WO2022/030583
PCT Pub. Date: Feb. 10, 2022

(65) Prior Publication Data
US 2023/0303421 A1    Sep. 28, 2023

(30) Foreign Application Priority Data
Aug. 7, 2020 (JP) ................. 2020-135396

(51) Int. Cl.
*C03B 19/06* (2006.01)
*G02B 6/02* (2006.01)

(52) U.S. Cl.
CPC ........ *C03B 19/066* (2013.01); *G02B 6/02042* (2013.01); *C03B 2201/02* (2013.01); *C03B 2203/14* (2013.01)

(58) Field of Classification Search
CPC .................. C03B 19/066; G02B 6/02042
See application file for complete search history.

(56) References Cited

U.S. PATENT DOCUMENTS

2007/0062223 A1* 3/2007 Paul .................. C03B 37/01473
428/428
2016/0318792 A1    11/2016 Suganuma et al.

FOREIGN PATENT DOCUMENTS

EP        1000908 A2    5/2000
JP        2000-178039 A  6/2000
(Continued)

OTHER PUBLICATIONS

Jun Yamamoto et al., "Fabrication of Multi Core Fiber by Using Slurry Casting Method", OFC (Optical Fiber Communication Conference) 2017, Th1H.5., 3 pgs.
(Continued)

*Primary Examiner* — Tina Wong
(74) *Attorney, Agent, or Firm* — Maier & Maier, PLLC

(57) ABSTRACT

A preform for optical fiber made of a quartz glass sintered body which is made from quartz glass powder as a main raw material, in which at least a portion of the quartz glass sintered body is an opaque body, the opaque body has a visible light transmittance of 90% or less at a length of 5 mm or less in one direction, and the opaque body has a bulk density of 2.1 g/cm³ or more, or the opaque body has a visible light transmittance of 90% or less at a length of 5 mm or less in one direction, and the opaque body has an open porosity of 3.5% or less.

13 Claims, 6 Drawing Sheets

(56) References Cited

FOREIGN PATENT DOCUMENTS

| | | |
|---|---|---|
| JP | 2003-221250 A | 8/2003 |
| JP | 2006-89317 A | 4/2006 |
| WO | 2015/107931 A1 | 7/2015 |

OTHER PUBLICATIONS

Written Opinion issued on Oct. 19, 2021, in corresponding International Application No. PCT/JP2021/029123, 7 pages.

* cited by examiner

PREFORM FOR OPTICAL FIBER AND MANUFACTURING METHOD OF OPTICAL FIBER

FIELD

The present invention relates to a preform for optical fiber and a manufacturing method of an optical fiber.

BACKGROUND

An optical fiber generally consists of a core having a high refractive index, and a clad layer having a low refractive index surrounding the core. The main raw material of both the core and the clad layer of the optical fiber is a nonmetallic inorganic substance containing quartz glass (silica glass) as a main component. A conventional general communication optical fiber has been a single mode fiber having one core serving as a signal transmission path. However, with an increase in transmission capacity in optical communication systems, a multicore fiber (MCF) having a plurality of cores in one optical fiber has been developed.

One of manufacturing methods of a multicore fiber is the rod-in tube method in which core rods are respectively inserted into holes of a clad preform manufactured by a slurry cast (or slurry casting) method and is drawn (Non Patent Literature 1). Unlike a press molding method and an extrusion method, the slurry cast method can mold the clad preform at normal pressure, and it is expected to reduce the manufacturing cost.

CITATION LIST

Non Patent Literature

Non Patent Literature 1: "Fabrication of Multi Core Fiber by Using Slurry Casting Method", OFC (Optical Fiber Communication Conference) 2017, Th1H.5.

SUMMARY

In order to obtain a high-quality MCF, it is necessary to improve the shape accuracy and dimensional accuracy of the clad preform. In the slurry cast method, a hardener is mixed with a glass raw material solution including quartz glass powder, a solvent, a dispersant, and a hardening resin to form a slurry, and the slurry is injected into a molding die in which a plurality of metal rods for core rod insertion holes are respectively disposed, and hardened. The hardened molded body is demolded, and the metal rods are removed. Then, the molded body is dried, degreased, and sintered to obtain a clad preform having holes for inserting core rods. Since the shape accuracy and dimensional accuracy of the clad preform mainly depend on the conditions of the sintering step, the sintering conditions have been conventionally set so as to obtain a transparent clad preform with advanced densification in the sintering step.

In order to obtain a clad preform consisting of dense transparent glass, it is necessary to set the sintering temperature high, but when the sintering temperature is high, the glass sintered body during sintering is soft and easily deformed. Therefore, depending on the shape accuracy and dimensional accuracy of the glass sintered body thus obtained, additional processing such as machining after sintering may be performed. Another problem is that, when the sintering temperature is high, cooling time becomes longer accordingly.

An object of the present invention is to provide a preform for optical fiber excellent in dimensional accuracy and shape accuracy without performing additional processing or without increasing manufacturing time in the manufacturing process of a preform for optical fiber including a glass sintered body.

A first mode of the present invention made to solve the above problems is a preform for optical fiber made of a quartz glass sintered body which is made from quartz glass powder as a main raw material, in which at least a portion of the quartz glass sintered body is an opaque body, the opaque body has a visible light transmittance of 90% or less at a length of 5 mm or less in one direction, and the opaque body has a bulk density of 2.1 $g/cm^3$ or more.

A second mode of the present invention is a preform for optical fiber made of a quartz glass sintered body which is made from quartz glass powder as a main raw material, in which at least a portion of the quartz glass sintered body is an opaque body, the opaque body has a visible light transmittance of 90% or less at a length of 5 mm or less in one direction, and the opaque body has an open porosity of 3.5% or less.

A third mode of the present invention is a preform for optical fiber made of a columnar quartz glass sintered body which is made from quartz glass powder as a main raw material, in which the preform includes a portion having a ratio of outer roundness to outer diameter of 0.5% or less and a bulk density of 2.1 $g/cm^3$ or more.

A fourth mode of the present invention is a preform for optical fiber made of a columnar quartz glass sintered body which is made from quartz glass powder as a main raw material, in which the preform includes a portion having a ratio of outer roundness to outer diameter of 0.5% or less and an open porosity of 3.5% or less.

A fifth mode of the present invention is a preform for optical fiber made of a quartz glass sintered body which is made from quartz glass powder as a main raw material, in which at least a portion of the quartz glass sintered body is an opaque body, the opaque body has a visible light transmittance of 2.5% or more and 90% or less at a length of 5 mm or less in one direction.

A sixth mode of the present invention is a preform for optical fiber made of a quartz glass sintered body which is made from quartz glass powder as a main raw material, in which the preform includes a portion having a ratio of outer roundness to outer diameter of 0.5% or less.

An optical fiber preform according to the present invention includes:

a clad preform having a through-hole; and a core preform inserted into the through-hole, in which at least one of the clad preform and the core preform is the preform for optical fiber according to any one of the first to sixth modes.

A manufacturing method of an optical fiber preform according to the present invention includes a step of inserting a core preform into a through-hole of a clad preform having the through-hole, and a step of sintering the clad preform and the core preform, to manufacture an optical fiber preform, in which at least one of the clad preform and the core preform is the preform for optical fiber according to any one of the first to sixth modes.

A manufacturing method of an optical fiber according to the present invention includes a step of drawing an optical fiber preform including:

a clad preform having a through-hole; and a core preform inserted into the through-hole, in which at least one of the clad preform and the core preform is the preform for optical fiber according to any one of the first to sixth modes.

Advantageous Effects of Invention

According to the present invention, a preform for optical fiber excellent in dimensional accuracy and shape accuracy can be obtained without performing additional processing or without increasing manufacturing time in the manufacturing process of a preform for optical fiber including a glass sintered body. By using a clad preform, a core preform, and an optical fiber preform including such a preform for optical fiber, an optical fiber excellent in dimensional accuracy and shape accuracy can be obtained.

DETAILED DESCRIPTION

The present invention relates to a preform for optical fiber made of a quartz glass sintered body which is made from quartz glass powder as a main raw material. The preform for optical fiber according to the present invention includes an optical fiber preform (optical fiber base material), a core preform (core base material), and a clad preform (clad base material).

The preform for optical fiber according to the present invention is characterized in that at least a portion of the quartz glass sintered body is an opaque body, the opaque body has a visible light transmittance of 90% or less at a length of 5 mm or less in one direction, and the opaque body has a bulk density of 2.1 g/cm$^3$ or more, or that at least a portion of the quartz glass sintered body is an opaque body, the opaque body has a visible light transmittance of 90% or less at a length of 5 mm or less in one direction, and the opaque body has an open porosity of 3.5% or less, or that at least a portion of the quartz glass sintered body is an opaque body, the opaque body has a visible light transmittance of 2.5% or more and 90% or less at a length of 5 mm or less in one direction.

If the preform for optical fiber according to the present invention has a columnar shape, the preform for optical fiber is characterized in that the preform includes a portion having a ratio of the outer roundness to the outer diameter of 0.5% or less and a bulk density of 2.1 g/cm$^3$ or more, or includes a portion having a ratio of the outer roundness to the outer diameter of 0.5% or less and an open porosity of 3.5% or less, or includes a portion having a ratio of the outer roundness to the outer diameter of 0.5% or less. Here, the portion having the ratio of the outer roundness is 0.5% or less includes a portion having the ratio of the outer roundness of approximately 0%, that is, a columnar preform for optical fiber the cross-sectional shape of which is approximately a complete round.

If the preform for optical fiber according to the present invention is an optical fiber preform, the optical fiber preform includes a core preform and a clad preform. Both the core preform and the clad preform may satisfy the requirements for the preform for optical fiber according to the present invention, or only one of the core preform and the clad preform may satisfy the requirements for the preform for optical fiber according to the present invention.

Hereinafter, an embodiment in which the preform for optical fiber according to the present invention is applied to a clad preform will be described.

Figure 1:
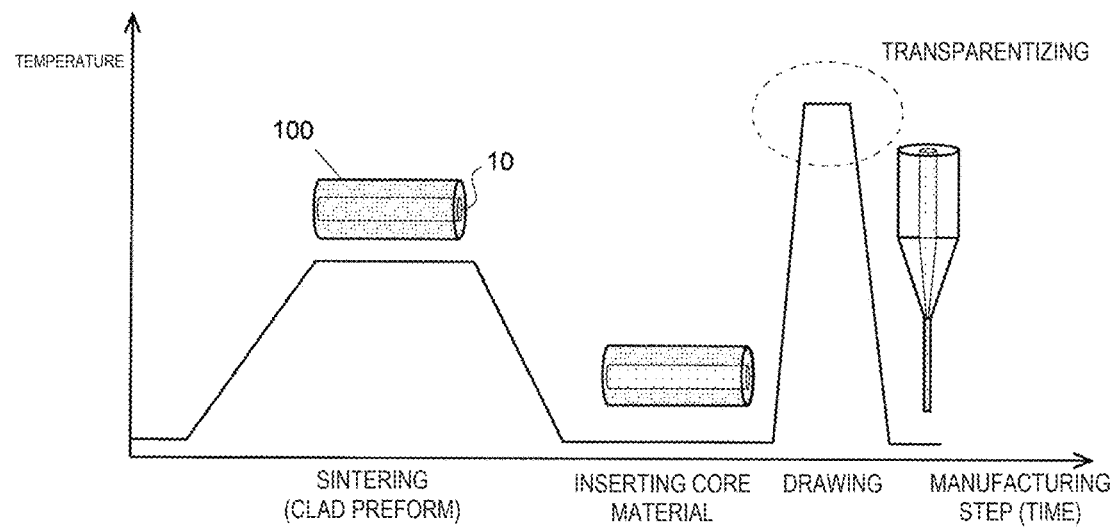
FIG. 1 is a schematic temperature profile in a step of manufacturing an optical fiber from a clad preform according to an embodiment of the present invention.

FIG. 1 illustrates a schematic temperature profile in steps of manufacturing an optical fiber from a clad preform of the present embodiment, where a horizontal axis represents time and a vertical axis represents temperature. As shown in FIG. 1, a clad preform 100 of the present embodiment includes a columnar glass sintered body, and has, inside the glass sintered body, a hole 10 penetrating both end surfaces. Although FIG. 1 shows the clad preform 100 having one hole 10, the clad preform 100 may have a plurality of holes. The outer shape of the clad preform is not limited to a columnar shape, and may be a prismatic shape. A clad preform having no hole penetrating both end surfaces may be used. In the case of this clad preform, a hole penetrating both end surfaces can be formed by cutting or the like.

In this embodiment, the clad preform 100 is manufactured by a slurry cast method. Manufacturing steps of the slurry cast method includes the steps of slurry blending, molding, demolding, drying, degreasing, and sintering. FIG. 1 shows the sintering step, which is the final step of the slurry cast method.

In the slurry cast method, first, a glass raw material solution containing a quartz glass powder, a solvent, a dispersant, and a hardening resin is placed in a ball mill and mixed over a predetermined time to blend a slurry (blending step). As the solvent, distilled water is usually used. The glass raw material solution may contain an additive (titanium dioxide ($TiO_2$), aluminum oxide ($Al_2O_3$), fluorine (F), or the like) for adjusting the refractive index of the clad. A slurry for manufacturing the core preform may contain germanium dioxide ($GeO_2$) in addition to the above-described additive as an additive for adjusting the refractive index of the core. It is not excluded that an unintended impurity is contained in the glass raw material solution. The slurry taken out from the ball mill is filled in a molding die in which a hole forming rod is disposed after a hardener is added.

When the slurry filled in the molding die is left at room temperature, the hardening resin is hardened (molding step). When the molded body is formed in the molding die by hardening the hardening resin, the molding die and the hole forming rod are removed from the molded body (demolding step). Subsequently, the molded body having the hole is dried, degreased, and sintered. In the drying step, the solvent (distilled water) in the molded body is mainly removed, and in the degreasing step, the hardening resin in the molded body is mainly removed. Then, a clad preform which is a glass sintered body having a hole is obtained by the sintering step.

The clad preform produced as described above is processed to be an optical fiber through a drawing step by a rod-in tube method, that is, after a core material is inserted into the hole of the clad preform. For the purpose of removing contaminants on a surface of the preform, flame polishing may be carried out before drawing. The temperature profile of drying, degreasing, sintering, flame polishing, and drawing is set in advance according to the composition of the slurry, the size and shape of the clad preform, and the like.

In the rod-in tube method, because the core preform is inserted into the hole of the clad preform, if the position of the hole of the clad preform is not as designed, if the interval between such holes is not as designed when the clad preform has a plurality of holes, or if the roundness of the hole is poor and a gap is generated around the core material inserted into the hole, the transmission characteristics of the obtained optical fiber may be deteriorated. If the roundness of the hole of the clad preform is poor, it may be necessary to etch the inner periphery of the hole of the clad preform and the outer periphery of the core preform. Therefore, high dimensional accuracy and shape accuracy are required for the clad preform.

As a result of studying conditions for obtaining a preform for optical fiber with high dimensional accuracy and shape accuracy, the present inventor has found that the sintering step may be completed in a state where densification of quartz glass powder, which is a main raw material of the glass sintered body, is almost completed, the glass does not need to be completely transparent, and the shape accuracy and the dimensional accuracy are rather deteriorated when sintering is performed until the glass is completely transparent. The preform for optical fiber according to the present invention has been made based on such findings.

Therefore, a major difference between the clad preform of the present embodiment and a conventional clad preform is that the former includes a glass sintered body that is incompletely transparent, whereas the latter includes a glass sintered body that is completely transparent. The glass sintered body that is incompletely transparent refers to a glass sintered body at least a portion of which includes an opaque portion. In the present embodiment, a portion having a visible light transmittance of 90% or less at a thickness of 5 mm or less is defined as a portion that is incompletely transparent, and a portion having a visible light transmittance of more than 90% is defined as a portion that is completely transparent.

The present inventor has found that bulk density and open porosity are effective as indices indicating that the densification of the quartz glass powder is substantially completed, so that the clad preform of the present embodiment has been defined with any of these indices and light transmittance.

Specifically, the clad preform according to the present embodiment is made of a columnar quartz glass sintered body which is made from quartz glass powder as a main raw material, the clad preform including a portion having a visible light transmittance of 90% or less at a thickness of 5 mm or less and a bulk density of 2.1 $g/cm^3$ or more, or a portion having a visible light transmittance of 90% or less at a thickness of 5 mm or less and an open porosity of 3.5% or less. Of course, the entire clad preform according to the present embodiment may satisfy the above requirements (light transmittance and bulk density, light transmittance and open porosity).

If the columnar glass sintered body is sufficiently densified, the outer roundness of the glass sintered body is good.

Therefore, the clad preform of the present embodiment can be defined by either the outer roundness or the indices described above.

Specifically, the clad preform according to the present embodiment is made of a columnar quartz glass sintered body which is made from quartz glass powder as a main raw material, the clad preform including a portion having a ratio of the outer roundness to the outer diameter of 0.5% or less and a bulk density of 2.1 g/cm$^3$ or more, or a portion having a ratio of the outer roundness to the outer diameter of 0.5% or less and an open porosity of 3.5% or less. Also in this case, the entire clad preform according to the present embodiment may satisfy the above requirements (ratio of outer roundness to outer diameter and bulk density, ratio of outer roundness to outer diameter and open porosity).

The bulk density and the open porosity can be measured using the Archimedes method (boiling method). When the dry mass of a sample (test piece) obtained by cutting out a portion of the clad preform is $W_1$ [g], the mass in water is $W_2$ [g], the mass of saturated water is $W_3$ [g], the bulk density is Pb [g/cm$^3$], and the open porosity is $P_O$ [%], the bulk density Pb and the open porosity $P_O$ are expressed by the following Equations (1) and (2), respectively:

$$Pb = \{W_1/(W_3-W_2)\} \times \rho \quad (1)$$

$$P_O = \{(W_3-W_1)/(W_3-W_2)\} \times 100 \quad (2)$$

In Equation (1), p represents the density [g/cm$^3$] of distilled water used for measurement.

The bulk density corresponds to a value obtained by dividing the mass of the sample by the total volume (outer volume) including closed pores and open pores when the sample has the open pores and the closed pores. The open porosity is a percentage ratio of the volume occupied by the volume of the open pore portion when the outer volume of the sample is 1.

Next, a manufacturing example performed to examine the manufacturing conditions of the clad preform according to the present embodiment will be described. The manufacturing conditions include the shape of the clad preform, the composition of the slurry, and the temperature conditions of each step from the slurry blending to the sintering.

Manufacturing Example 1

In Manufacturing Example 1, five samples 1 to 5 were prepared in which only the temperature condition of the sintering step was varied among manufacturing conditions. The manufacturing conditions of these samples 1 to 5 are as shown in Table 1. As shown in Table 1, in Manufacturing Example 1, the manufacturing conditions were set so as to obtain, from each of the samples 1 to 5, a clad preform including a columnar glass sintered body having seven holes penetrating both end surfaces, the clad preform having an outer diameter of 30 mm, a length of 400 mm, and an inner diameter of each hole of 5.85 mm. Although not shown in Table 1, the steps from molding to drying were performed under general temperature conditions.

TABLE 1

| Item | Sample 1 | Sample 2 | Sample 3 | Sample 4 | Sample 5 |
|---|---|---|---|---|---|
| Average particle size of quartz powder | | | 2 μm | | |
| Outer diameter × length [mm] | φ30 × 400 | φ30 × 400 | φ30 × 400 | φ30 × 400 | φ30 × 400 |
| Hole diameter [mm] | φ5.85 | φ5.85 | φ5.85 | φ5.85 | φ5.85 |
| Number of holes | 7 | 7 | 7 | 7 | 7 |
| Blending ratio of slurry | | | | | |
| Quartz powder [wt %] | 71.5% | 71.5% | 71.5% | 71.5% | 71.5% |
| Water [wt %] | 18.5% | 18.5% | 18.5% | 18.5% | 18.5% |
| Resin [wt %] | 8.4% | 8.4% | 8.4% | 8.4% | 8.4% |
| Dispersant [wt %] | 1.6% | 1.6% | 1.6% | 1.6% | 1.6% |
| Degreasing condition | 850° C. | 850° C. | 850° C. | 850° C. | 850° C. |
| Sintering condition | 1690° C. Hold 1 minute | 1600° C. Hold 30 minutes | 1550° C. Hold 30 minutes | 1500° C. Hold 30 minutes | 1450° C. Hold 30 minutes |

Figure 2:
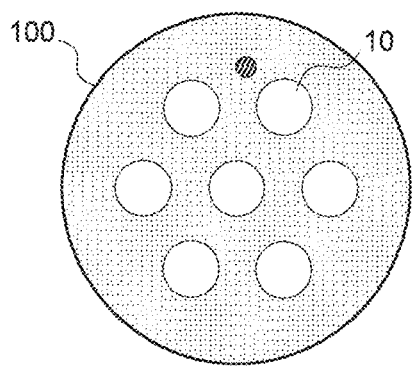
FIG. 2 is a cross-sectional view of a clad preform.

The outer diameter, the outer roundness, the ratio (%) of the outer roundness to the outer diameter, the hole diameter, the hole roundness, and the light transmittance of the clad preform obtained from each of the samples 1 to 5 are shown in Table 2. A cross section of the clad preform obtained from each of the samples 1 to 5 is shown in FIG. 2. The outer diameter and the outer roundness of the clad preform are average values of values measured at positions of 10 mm, 100 mm, 200 mm, 300 mm, and 390 mm from one of both ends in the longitudinal direction of the clad preform. The hole diameter is an average value of the inner diameters of the seven holes measured at the positions of 10 mm and 390 mm, and the hole roundness is an average value of the roundness of the seven holes. The light transmittance was defined as a light transmittance when an end portion of the obtained clad preform was cut, and both end surfaces of the cut clad preforms were mirror-polished to obtain a thin piece having a thickness of 2 mm and a thin piece having a thickness of 5 mm, and the surfaces of the respective thin pieces were irradiated with visible light (beam diameter: about 3 mm) having a wavelength of 530 nm from a direction perpendicular to the surfaces. A column in which "-" is displayed in Table 2 indicates that the item is not measured. The portion indicated by a black circle in FIG. 2 is the portion irradiated with the visible light beam.

TABLE 2

| Item | Sample 1 | Sample 2 | Sample 3 | Sample 4 | Sample 5 |
|---|---|---|---|---|---|
| Outer diameter [mm] | 29.94 | 29.93 | 30.09 | 30.07 | 30.03 |
| Outer roundness [mm] | 0.430 | 0.362 | 0.196 | 0.109 | 0.070 |
| Outer roundness/outer diameter [%] | 1.44 | 1.21 | 0.65 | 0.36 | 0.23 |
| Hole diameter [mm] | 5.79 | 5.83 | 5.89 | 5.89 | 5.91 |
| Hole roundness [mm] | 0.155 | 0.094 | 0.076 | 0.033 | 0.021 |
| Light transmittance [%] $\lambda = 530$ nm (Thickness 2 mm) | 91.6% | 91.4% | 91.6% | 87.8% | — |
| Light transmittance [%] $\lambda = 530$ nm (Thickness 5 mm) | 92.4% | 92.7% | 92.5% | — | 83.2% |

Figure 3:
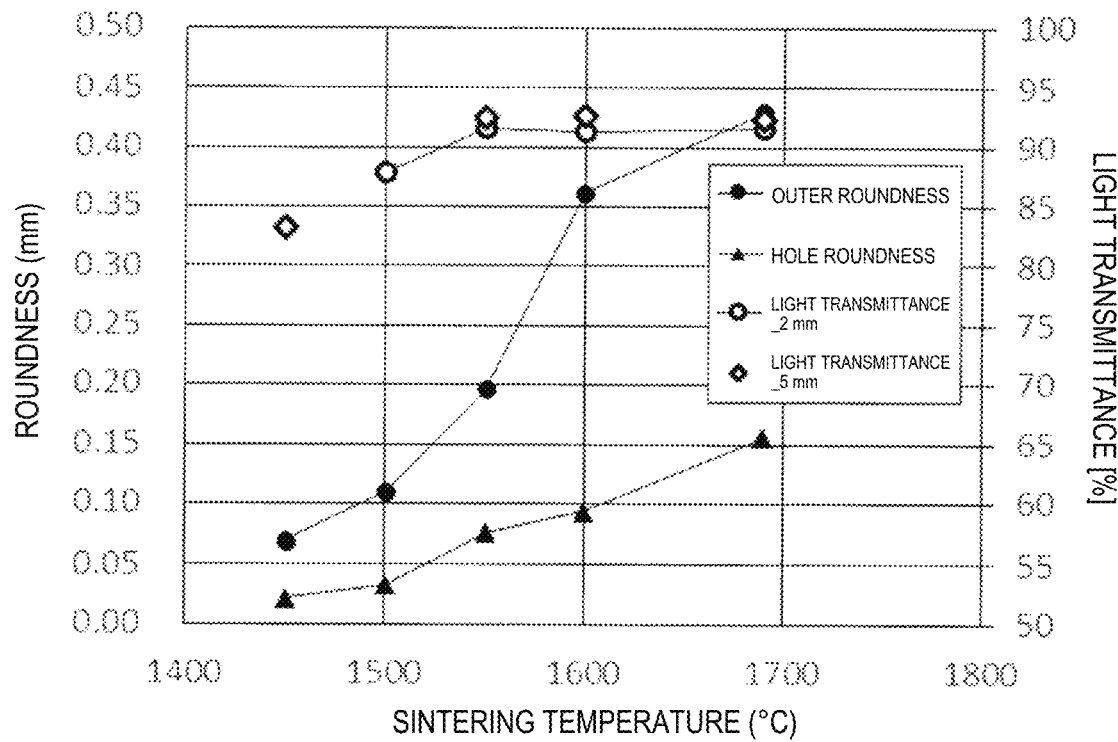
FIG. 3 is a graph showing the relationships between the sintering temperature and the light transmittance, the sintering temperature and the outer roundness, and the sintering temperature and the hole roundness of clad preforms obtained from samples 1 to 5 used in Manufacturing Example 1.

FIG. 3 shows the relationships between the outer roundness and the sintering temperature, the hole roundness and the sintering temperature, and the light transmittance (thickness 5 mm, thickness 2 mm) and the sintering temperature (see Tables 1 and 2) of the clad preforms obtained from the samples 1 to 5. As can be seen from FIG. 3, as the sintering temperature was higher, the outer roundness and the hole roundness deteriorated (the value of the roundness increased). When the sintering temperature was lower than 1550° C., the light transmittance increased as the sintering temperature was higher, but when the sintering temperature was 1550° C. or higher, the light transmittance was substantially constant. From this, it can be said that the clad preforms obtained by setting the sintering temperature to 1550° C. or higher are sufficiently densified.

Manufacturing Example 2

In Manufacturing Example 2, four samples 6 to 9 were prepared in which only the temperature condition of the sintering step was varied among manufacturing conditions. The manufacturing conditions of these samples 6 to 9 are as shown in Table 3. As shown in Table 3, in Manufacturing Example 2, the manufacturing conditions were set so as to obtain, from each of the samples 6 to 9, a clad preform including a columnar glass sintered body having seven holes penetrating both end surfaces, the clad preform having an outer diameter of 28.7 mm, a length of 400 mm, and an inner diameter of each hole of 5.6 mm. Although not shown in Table 3, the steps from molding to drying were performed under general temperature conditions.

TABLE 3

| Item | Sample 6 | Sample 7 | Sample 8 | Sample 9 |
|---|---|---|---|---|
| Average particle size of quartz powder | 0.1 μm | | | |
| Outer diameter × length [mm] | φ28.7 × 400 | φ28.7 × 400 | φ28.7 × 400 | φ28.7 × 400 |
| Hole diameter [mm] | 5.6 | 5.6 | 5.6 | 5.6 |
| Number of holes | 7 | 7 | 7 | 7 |
| Blending ratio of slurry | | | | |
| Quartz powder [wt %] | 66.2% | 66.2% | 66.2% | 66.2% |
| Water [wt %] | 23.9% | 23.9% | 23.9% | 23.9% |
| Resin [wt %] | 7.6% | 7.6% | 7.6% | 7.6% |
| Dispersant [wt %] | 2.3% | 2.3% | 2.3% | 2.3% |

TABLE 3-continued

| Item | Sample 6 | Sample 7 | Sample 8 | Sample 9 |
|---|---|---|---|---|
| Degreasing condition | 850° C. | 850° C. | 850° C. | 850° C. |
| Sintering condition | 1690° C. Hold 1 minute | 1550° C. Hold 30 minutes | 1500° C. Hold 30 minutes | 1450° C. Hold 30 minutes |

The outer diameter, the outer roundness, the ratio (%) of the outer roundness to the outer diameter, the hole diameter, the hole roundness, and the light transmittance of the clad preform obtained from each of the samples 6 to 9 are shown in Table 4. The method of obtaining each value, the method of producing a thin piece in which the light transmittance was measured, and the measurement point of the light transmittance were the same as in Manufacturing Example 1.

TABLE 4

| Item | Sample 6 | Sample 7 | Sample 8 | Sample 9 |
|---|---|---|---|---|
| Outer diameter [mm] | 28.74 | 28.74 | 28.79 | 28.80 |
| Outer roundness [mm] | 0.259 | 0.166 | 0.087 | 0.058 |
| Outer roundness/outer diameter [%] | 0.90 | 0.58 | 0.30 | 0.20 |
| Hole diameter [mm] | 5.61 | 5.63 | 5.64 | 5.65 |
| Hole roundness [mm] | 0.099 | 0.043 | 0.023 | 0.012 |
| Light transmittance [%] $\lambda$ = 530 nm (Thickness 2 mm) | 94.2% | 93.9% | 93.6% | 92.2% |

Figure 4:
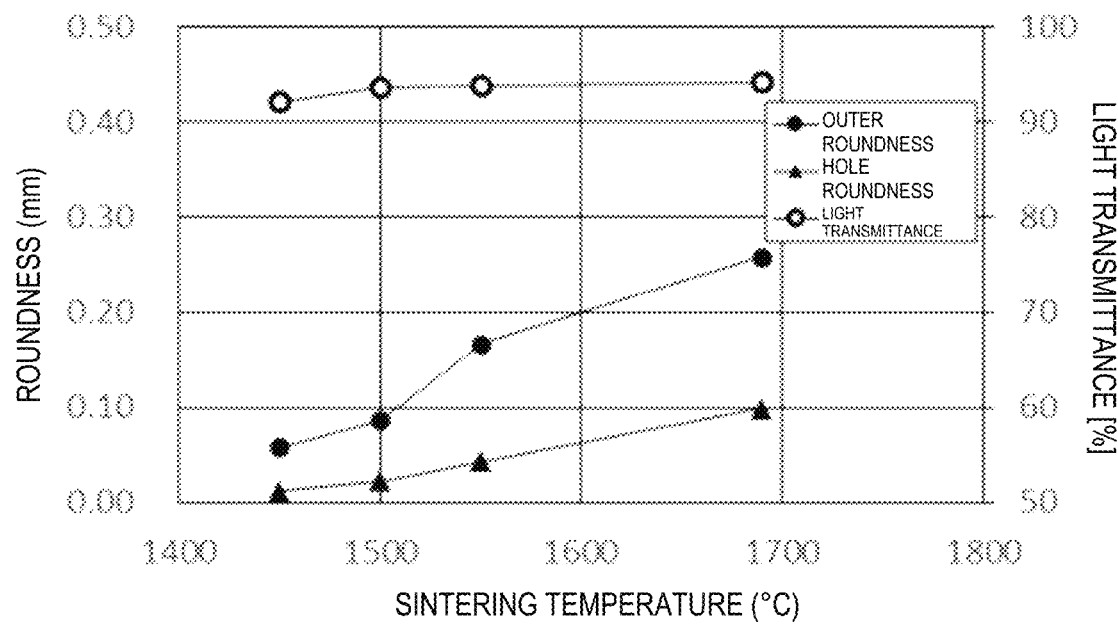
FIG. 4 is a graph showing the relationships between the sintering temperature and the light transmittance, the sintering temperature and the outer roundness, and the sintering temperature and the hole roundness of clad preforms obtained from samples 6 to 9 used in Manufacturing Example 2.
Figure 5:
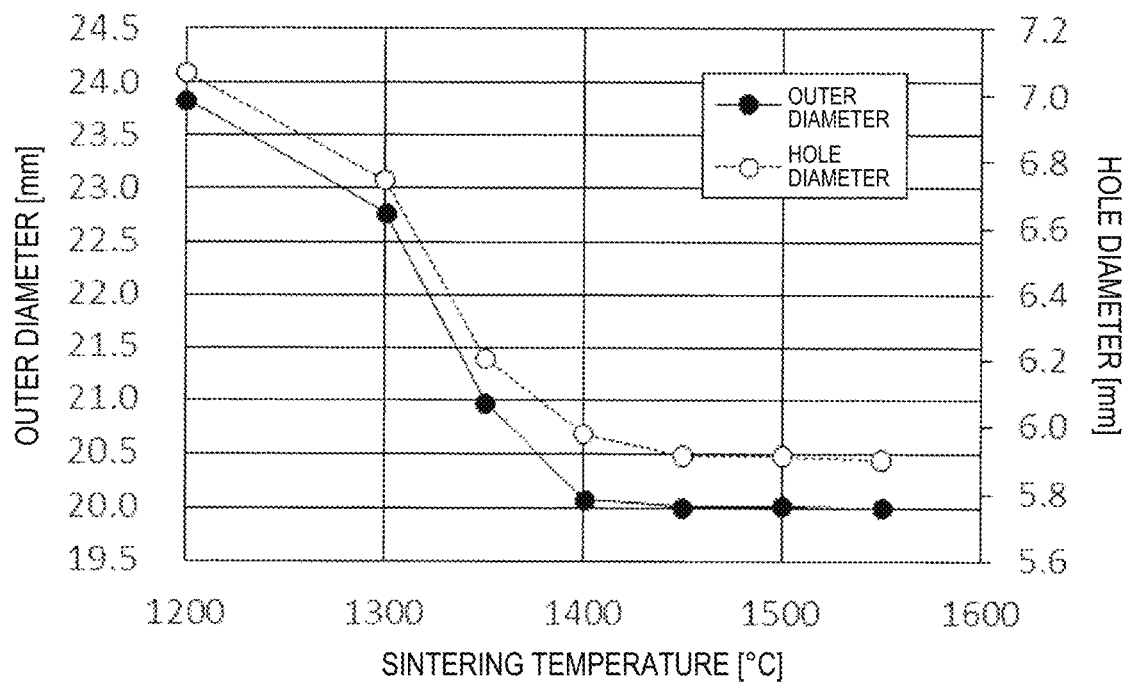
FIG. 5 is a graph showing the relationships between the sintering temperature and the outer diameters, and the sintering temperature and the hole diameters of clad preforms obtained from samples 10 to 20 used in Manufacturing Example 3.
Figure 6:
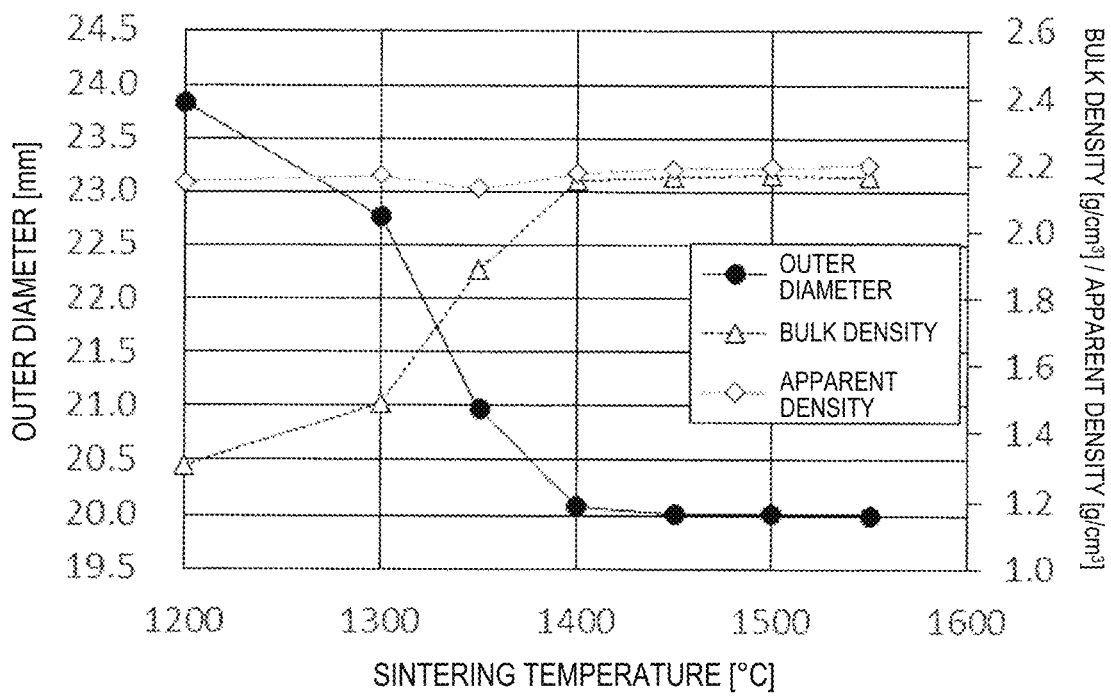
FIG. 6 is a graph showing the relationships between the sintering temperature and the outer diameters, the sintering temperature and the bulk density, and the sintering temperature and the apparent density of the clad preforms obtained from the samples 10 to 20 used in Manufacturing Example 3.
Figure 7:
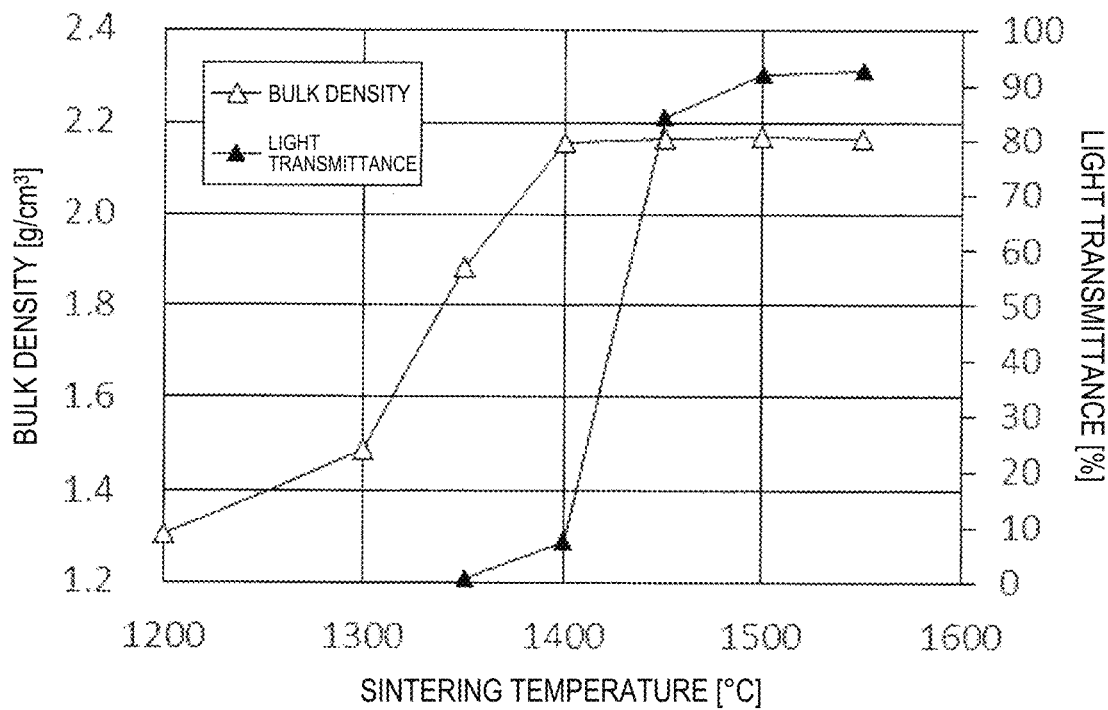
FIG. 7 is a graph showing the relationships between the sintering temperature and the bulk density, and the sintering temperature and the light transmittance of the clad preforms obtained from the samples 10 to 20 used in Manufacturing Example 3.

FIG. 4 shows the relationships between the outer roundness and the sintering temperature, the hole roundness and the sintering temperature, and the light transmittance and the sintering temperature (see Tables 3 and 4) of the clad preforms obtained from the samples 6 to 9. As can be seen from FIG. 4, also in Manufacturing Example 2, as the sintering temperature was higher, the outer roundness and the hole roundness deteriorated (the value of the roundness increased). In Manufacturing Example 2, the light transmittance was substantially constant at a sintering temperature of 1500° C. or higher. From this, it can be said that the clad preform obtained by setting the sintering temperature to 1500° C. or higher is sufficiently densified.

Manufacturing Example 3

In Manufacturing Example 3, 11 samples 10 to 20 were prepared in which only the temperature condition of the sintering step was varied among manufacturing conditions. The manufacturing conditions of these samples 10 to 20 are as shown in Table 5. As shown in Table 5, in Manufacturing Example 3, the manufacturing conditions were set so as to obtain, from each of the samples 10 to 19, a clad preform including a columnar glass sintered body having one hole penetrating both end surfaces, the clad preform having an outer diameter of 20 mm, a length of 400 mm, and an inner diameter of each hole of 5.85 mm. The manufacturing conditions were set so as to obtain, from the sample 20, a clad preform including a (solid) columnar glass sintered body having no hole, the clad preform having an outer diameter of 20 mm and a length of 400 mm. Although not shown in Table 5, the steps from molding to drying were performed under general temperature conditions.

TABLE 5

| Item | Sample 10 | Sample 11 | Sample 12 | Sample 13 | Sample 14 | Sample 15 | Sample 16 | Sample 17 | Sample 18 | Sample 19 | Sample 20 |
|---|---|---|---|---|---|---|---|---|---|---|---|
| Average particle size of quartz powder | | | | | | 2 μm | | | | | |
| Outer diameter × length [mm] | φ20 × 400 | φ20 × 400 | φ20 × 400 | φ20 × 400 | φ20 × 400 | φ20 × 400 | φ20 × 400 | φ20 × 400 | φ20 × 400 | φ20 × 400 | φ20 × 400 |
| Hole diameter [mm] | φ5.85 | φ5.85 | φ5.85 | φ5.85 | φ5.85 | φ5.85 | φ5.85 | φ5.85 | φ5.85 | φ5.85 | — |
| Number of holes | 1 | 1 | 1 | 1 | 1 | 1 | 1 | 1 | 1 | 1 | — |
| Blending ratio of slurry | | | | | | | | | | | |
| Quartz powder [wt %] | 71.5% | 71.5% | 71.5% | 71.5% | 71.5% | 71.5% | 71.5% | 71.5% | 71.5% | 71.5% | 71.5% |
| Water [wt %] | 18.5% | 18.5% | 18.5% | 18.5% | 18.5% | 18.5% | 18.5% | 18.5% | 18.5% | 18.5% | 18.5% |
| Resin [wt %] | 8.4% | 8.4% | 8.4% | 8.4% | 8.4% | 8.4% | 8.4% | 8.4% | 8.4% | 8.4% | 8.4% |
| Dispersant [wt %] | 1.6% | 1.6% | 1.6% | 1.6% | 1.6% | 1.6% | 1.6% | 1.6% | 1.6% | 1.6% | 1.6% |

TABLE 5-continued

| Item | Sample 10 | Sample 11 | Sample 12 | Sample 13 | Sample 14 | Sample 15 | Sample 16 | Sample 17 | Sample 18 | Sample 19 | Sample 20 |
|---|---|---|---|---|---|---|---|---|---|---|---|
| Degreasing condition | 850° C. | 850° C. | 850° C. | 850° C. | 850° C. | 850° C. | 850° C. | 850° C. | 850° C. | 850° C. | 850° C. |
| Sintering temperature [° C.] | 1200 | 1300 | 1350 | 1400 | 1400 | 1400 | 1450 | 1450 | 1500 | 1550 | 1690 |
| Sintering time [min] | 30 | 30 | 30 | 30 | 30 | 30 | 30 | 30 | 30 | 30 | 1 |

The outer diameter and the hole diameter (the inner diameter of the hole), the apparent density, the bulk density, the open porosity, the Vickers hardness, and the light transmittance of the clad preform obtained from each of the samples 10 to 20 were measured.

The measurement results for the samples 10 to 20 are shown in Table 6. The method of obtaining the outer diameter of the clad preform is the same as that in Manufacturing Example 1. The apparent density, the bulk density, and the open porosity were all measured by the boiling method (JIS 1634) (for the bulk density and the open porosity, see Equations (1) and (2) described above). A column in which "-" is displayed in Table 6 indicates that the item is not measured. For the samples 10 and 11, since the entire glass sintered bodies obtained were white, and the light transmittance of the glass sintered body obtained from the sample 12 having a higher sintering temperature than the samples 10 and 11 was 0.9%, the light transmittance was expected to be approximately 0%, and thus the light transmittance was not measured. Since the densification of the glass sintered bodies obtained from the samples 10 and 11 having low sintering temperatures did not proceed and it was expected that measurement of the Vickers hardness would be difficult, the measurement was omitted.

In Manufacturing Example 3, an optical fiber was obtained by inserting a core preform into the hole of the clad preform obtained from each of the samples 14, 15, and 18 and performing drawing, and a transmission loss of the optical fiber was measured. The samples 14 and 18 were flame polished before drawing, and the sample 15 was not flame polished. The results are also shown in Table 6.

TABLE 6

| Item | Sample 10 | Sample 11 | Sample 12 | Sample 13 | Sample 14 | Sample 15 | Sample 16 | Sample 17 | Sample 18 | Sample 19 | Sample 20 |
|---|---|---|---|---|---|---|---|---|---|---|---|
| Outer diameter [mm] | 23.84 | 22.77 | 20.97 | 20.04 | 20.04 | 20.17 | 20.02 | 20.01 | 20.02 | 20.00 | 20.03 |
| Inner diameter [mm] | 7.07 | 6.75 | 6.20 | 5.97 | 5.95 | 6.00 | 5.91 | 5.91 | 5.91 | 5.90 | — |
| Apparent density [g/cm$^3$] | 2.15 | 2.17 | 2.13 | 2.19 | 2.18 | 2.15 | 2.19 | 2.19 | 2.19 | 2.20 | 2.20 |
| Bulk density [g/cm$^3$] | 1.31 | 1.49 | 1.88 | 2.17 | 2.17 | 2.13 | 2.17 | 2.16 | 2.17 | 2.17 | 2.19 |
| Open porosity [%] | 39.3 | 31.5 | 11.6 | 0.8 | 0.8 | 1.1 | 1.0 | 1.3 | 1.0 | 1.7 | 0.5 |
| Vickers hardness [kgf/mm$^2$] | | | 414 | 633 | 636 | 659 | 763 | 801 | 791 | — | — |
| Light transmittance [%] λ = 530 nm | — | — | 0.9 | 10.0 | 9.8 | 2.9 | 83.7 | 85.1 | 92.1 | 92.8 | — |
| Carrying out drawing | — | — | — | — | ○ (With flame polishing) | ○ (Without flame polishing) | — | — | ○ (With flame polishing) | — | — |
| Optical fiber transmission loss [dB/km] | — | — | — | — | 0.21 | 0.25 | — | — | 0.19 | — | — |

FIGS. 5 to 12 are graphs showing the relationships between the outer diameters, the hole diameters, the bulk density, the light transmittance, the open porosity, the contraction ratios, and the sintering temperature (see Tables 5 and 6) of the clad preforms obtained in Manufacturing Example 3.

From the results in FIGS. 5 to 12, it was presumed that densification of glass starts when the sintering temperature exceeds 1400° C., and transparentizing starts when the sintering temperature exceeds 1450° C. Therefore, it can be said that if the characteristics of the clad preform obtained by setting the sintering temperature to 1400° C. to 1450° C. are satisfied, a clad preform of a dense and opaque glass sintered body is obtained.

Figure 8:
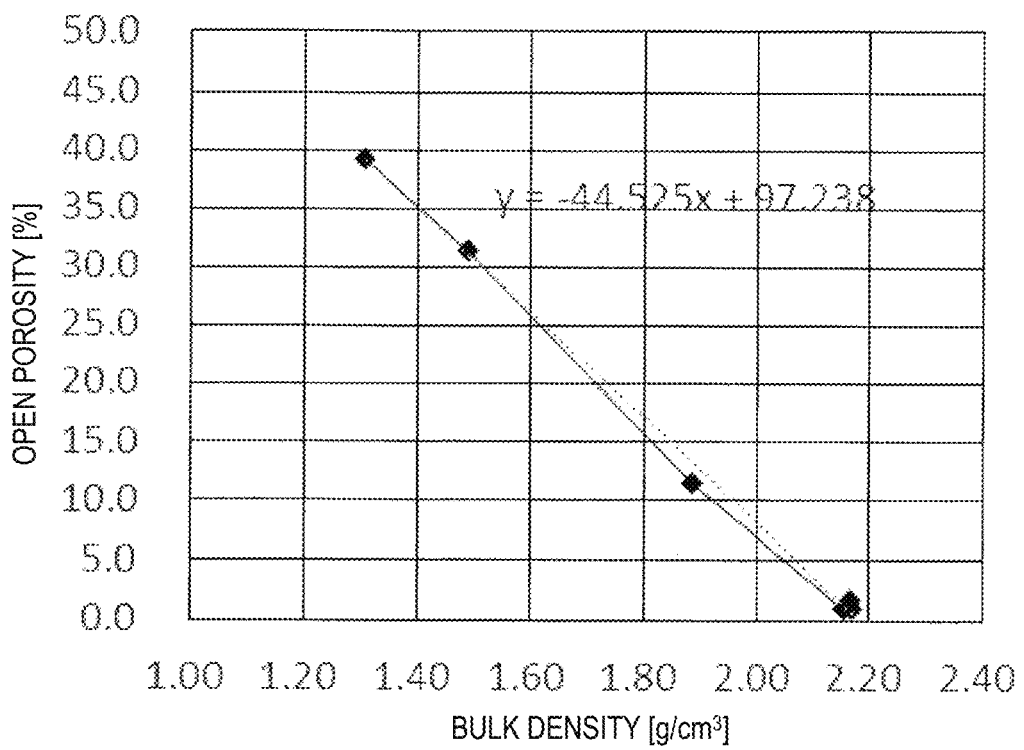
FIG. 8 is a graph showing the relationship between the bulk density and the open porosity of the clad preforms obtained from the samples 10 to 20 used in Manufacturing Example 3.
Figure 9:
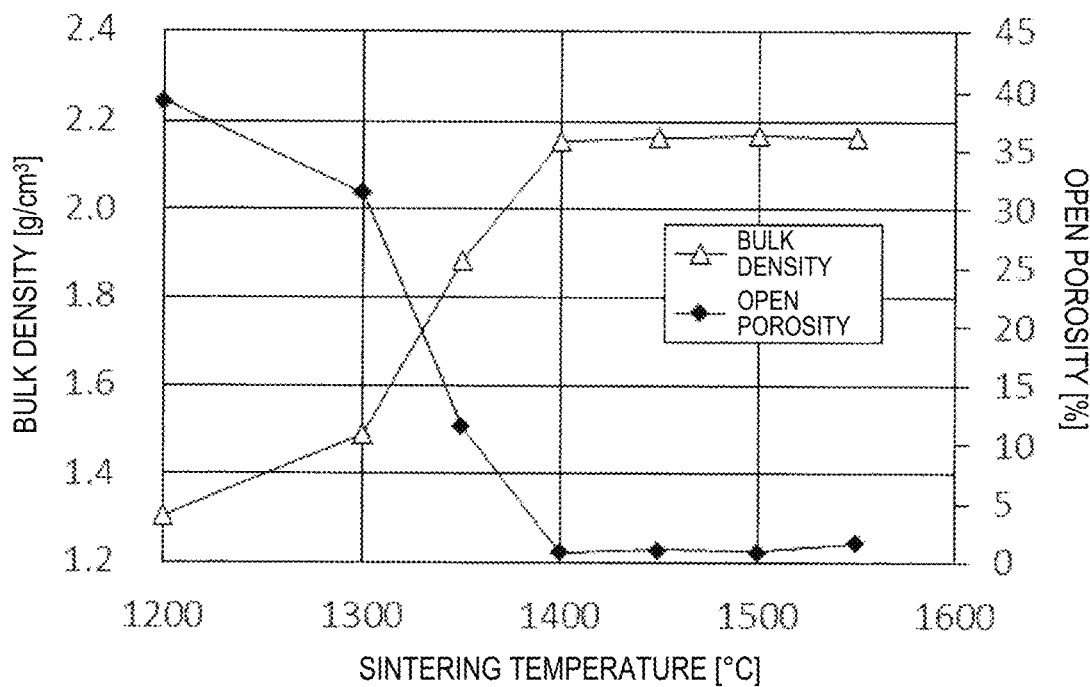
FIG. 9 is a graph showing the relationships between the sintering temperature and the bulk density, and the sintering temperature and the open porosity of the clad preforms obtained from the samples 10 to 20 used in Manufacturing Example 3.
Figure 10:
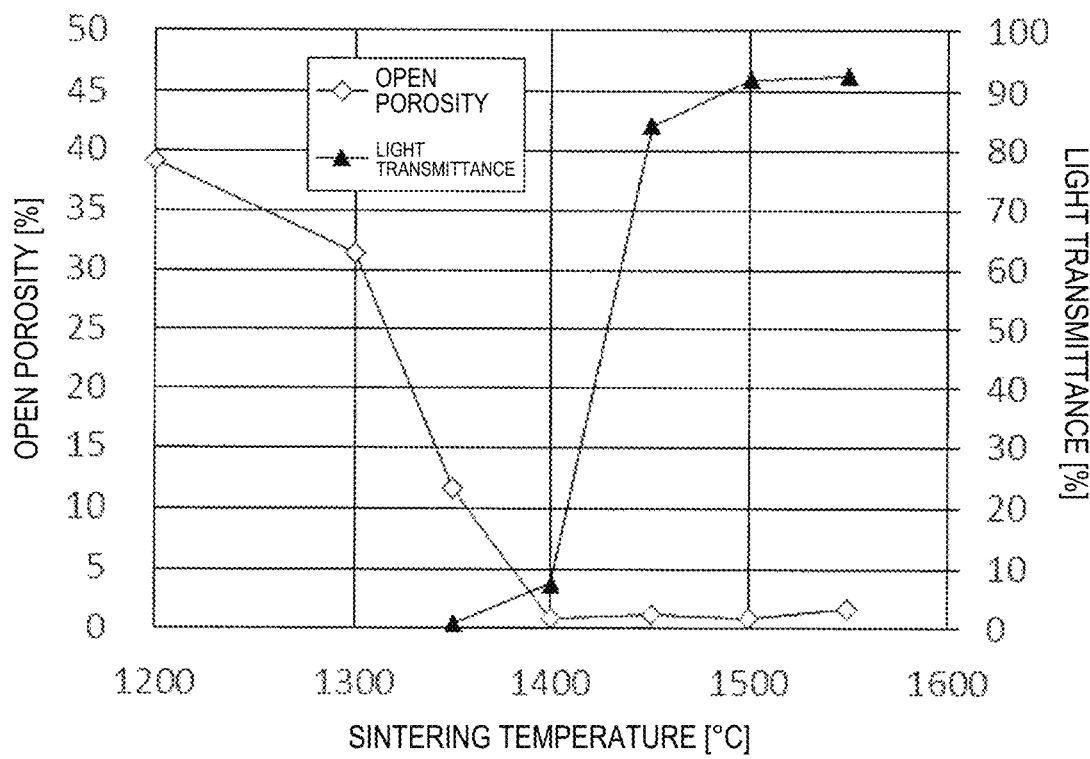
FIG. 10 is a graph showing the relationships between the sintering temperature and the open porosity, and the sintering temperature and the light transmittance of the clad preforms obtained from the samples 10 to 20 used in Manufacturing Example 3.
Figure 11:
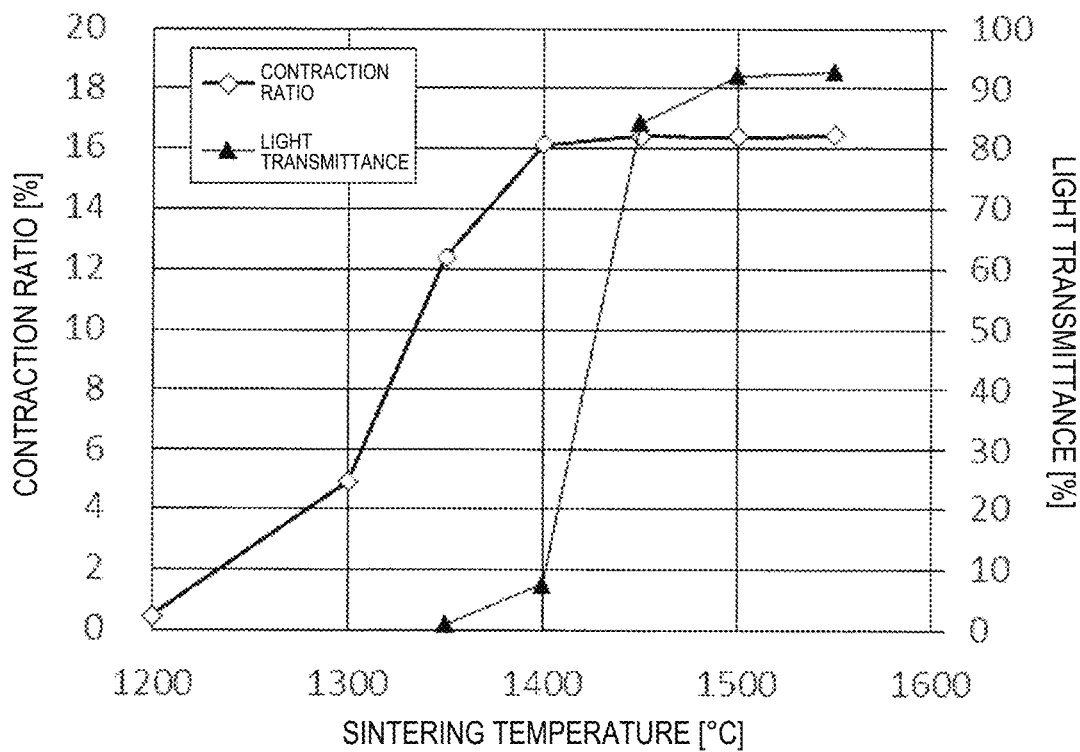
FIG. 11 is a graph showing the relationships between the sintering temperature and the contraction ratios, and the sintering temperature and the light transmittance of the clad preforms obtained from the samples 10 to 20 used in Manufacturing Example 3.
Figure 12:
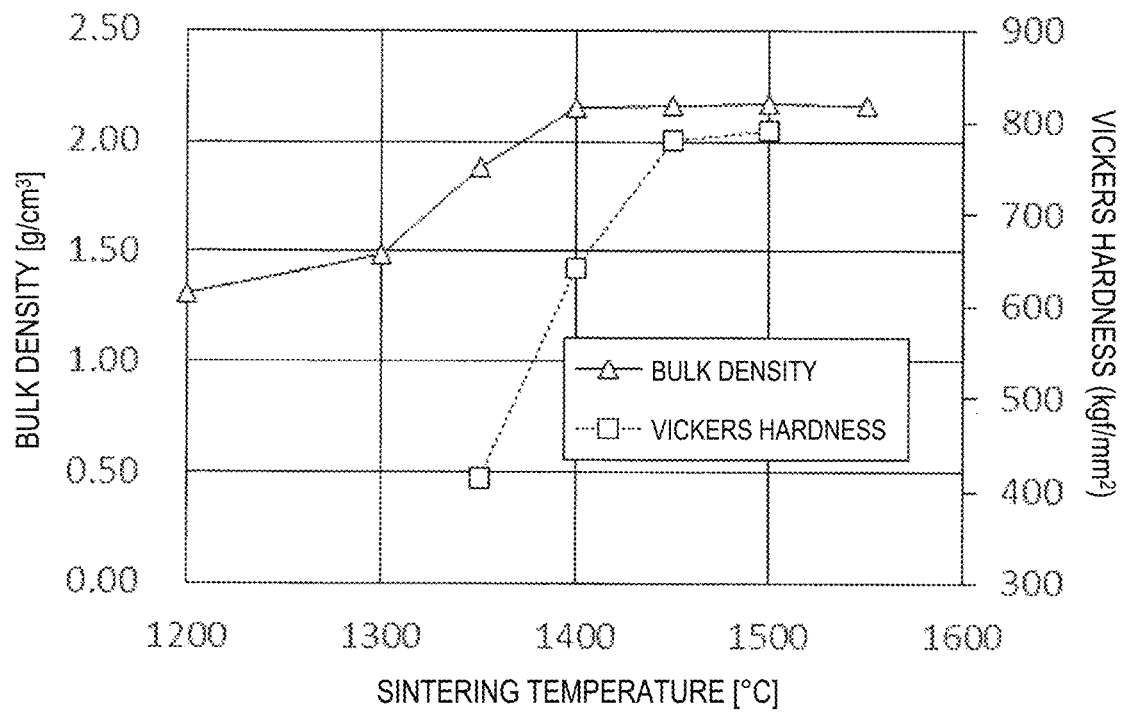
FIG. 12 is a graph showing the relationships between the sintering temperature and the bulk density, and the sintering temperature and the Vickers hardness of the clad preforms obtained from the samples 10 to 20 used in Manufacturing Example 3.

From FIG. 8, since there is a high correlation between the bulk density and the open porosity, it can be said that the clad preform of the present embodiment can be defined regardless of whether the bulk density or the open porosity is used.

Furthermore, when optical fibers were produced by drawing the clad preforms (samples 14, 15) obtained by setting the sintering temperature to 1400° C. and the clad preform (sample 18) obtained by setting the sintering temperature to 1500° C., it was found that the samples 14 and 15 had slightly poorer transmission losses than the sample 18, but there was no problem. From this, it can be said that the clad preform of the present embodiment is useful as a preform of optical fiber.

REFERENCE SIGNS LIST

10 . . . Hole
100 . . . Clad Preform

The invention claimed is:

1. A method of manufacturing a preform for optical fiber made of a quartz glass sintered body, the method comprising:
  a step of mixing a glass raw material solution containing a quartz glass powder, a solvent, a dispersant, and a hardening resin to blend a slurry;
  a step of hardening a mixture of the slurry and a hardener in a molding die to form a molded body;
  a step of removing the molding die from the molded body;
  a step of drying the molded body;
  a step of degreasing the molded body after the step of drying;
  a step of sintering the molded body after the step of degreasing to obtain the quartz glass sintered body, wherein:
  (a) at least a portion of the quartz glass sintered body is an opaque body, the opaque body has a visible light transmittance of 90% or less at a length of 5 mm or less in one direction, and the opaque body has a bulk density of 2.1 g/cm3 or more;
  (b) at least a portion of the quartz glass sintered body is an opaque body, the opaque body has a visible light transmittance of 90% or less at a length of 5 mm or less in one direction, and the opaque body has an open porosity of 3.5% or less; or
  (c) at least a portion of the quartz glass sintered body is an opaque body, the opaque body has a visible light transmittance of 2.5% or more and 90% or less at a length of 5 mm or less in one direction.

2. A preform for optical fiber made of a columnar quartz glass sintered body which is made from quartz glass powder as a main raw material, wherein:
  (a) the preform includes a portion having a ratio of outer roundness of a difference between a maximum outer diameter and a minimum outer diameter of the columnar quartz glass sintered body to outer diameter of the columnar quartz glass sintered body of 0.5% or less and a bulk density of 2.1 g/cm3 or more;
  (b) the preform includes a portion having the ratio of outer roundness to the outer diameter of 0.5% or less and an open porosity of 3.5% or less; or
  (c) the preform includes a portion having the ratio of outer roundness to the outer diameter of 0.5% or less.

3. The method of manufacturing the preform for the optical fiber according to claim 1, wherein the quartz glass sintered body is a clad preform having a through-hole for inserting a core material.

4. The method of manufacturing the preform for the optical fiber according to claim 1, wherein the quartz glass sintered body is a core preform.

5. An optical fiber preform comprising:
  a clad preform having a through-hole; and a
  core preform inserted into the through-hole, wherein at least one of the clad preform and the core preform is manufactured by the method of manufacturing the preform for optical fiber according to claim 1.

6. A manufacturing method of an optical fiber preform comprising:
  a step of manufacturing the optical fiber preform by inserting a core preform into a through-hole of a clad preform having a through-hole, and
  a step of sintering the clad preform and the core preform, wherein at least one of the clad preform and the core preform is manufactured by the method of manufacturing the preform for optical fiber according to claim 1.

7. A method of manufacturing an optical fiber, the method comprising:
  a step of drawing the optical fiber preform according to claim 5.

8. The preform for optical fiber according to claim 2, wherein the quartz glass sintered body is a clad preform having a through-hole for inserting a core material.

9. The preform for optical fiber according to claim 2, wherein the quartz glass sintered body is a core preform.

10. An optical fiber preform comprising:
  a clad preform having a through-hole; and
  a core preform inserted into the through-hole, wherein at least one of the clad preform and the core preform is the preform for optical fiber according to claim 2.

11. A manufacturing method of an optical fiber preform comprising
  a step of manufacturing the optical fiber preform by inserting a core preform into a through-hole of a clad preform having a through-hole, and
  a step of sintering the clad preform and the core preform, wherein at least one of the clad preform and the core preform is the preform for optical fiber according to claim 2.

12. A method of manufacturing an optical fiber, the method comprising a step of drawing the optical fiber preform according to claim 10.

13. A method of manufacturing a preform for optical fiber made of a quartz glass sintered body, the method comprising:
  a step of mixing a glass raw material solution containing a quartz glass powder, a solvent, a dispersant, and a hardening resin to blend a slurry;

a step of hardening a mixture of the slurry and a hardener in a molding die to form a molded body;

a step of removing the molding die from the molded body;

a step of drying the molded body;

a step of degreasing the molded body after the step of drying;

a step of sintering the molded body after the step of degreasing to obtain the quartz glass sintered body, wherein:

(a) the preform includes a portion having a ratio of outer roundness of a difference between a maximum outer diameter and a minimum outer diameter of the columnar quartz glass sintered body to outer diameter of the columnar quartz glass sintered body of 0.5% or less and a bulk density of 2.1 g/cm$^3$ or more;

(b) the preform includes a portion having the ratio of outer roundness to the outer diameter of 0.5% or less and an open porosity of 3.5% or less; or (c) the preform includes a portion having the ratio of outer roundness to the outer diameter of 0.5% or less.

* * * * *